J. LAWRENCE.
WATER HEATER.
APPLICATION FILED DEC. 17, 1915.
1,177,255.
Patented Mar. 28, 1916.
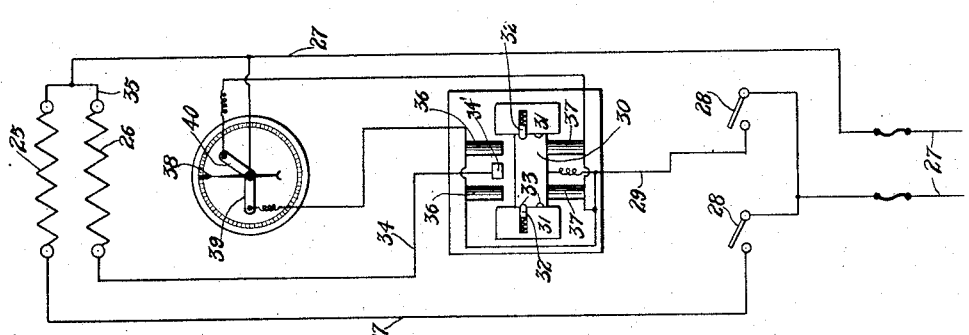
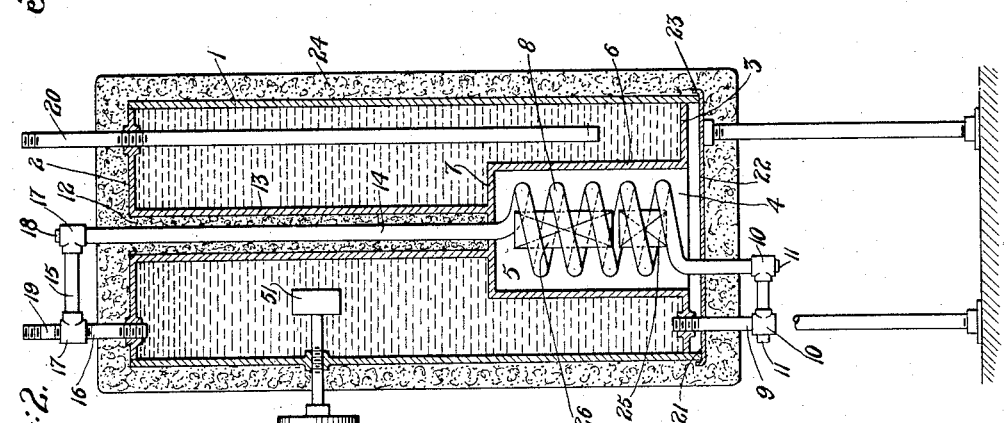
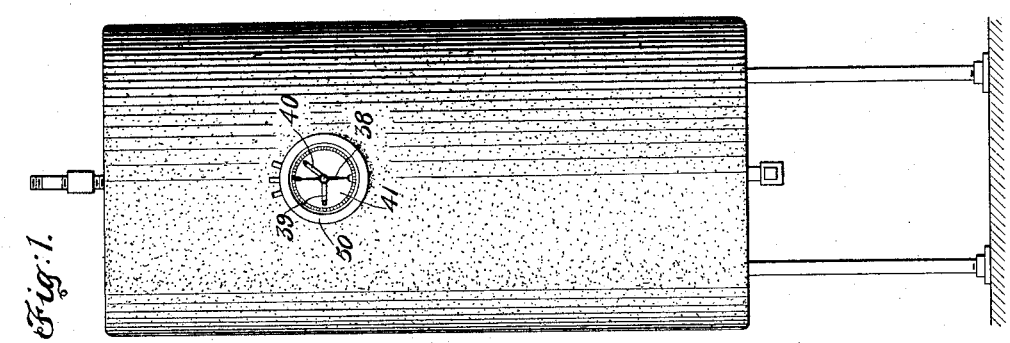
James Lawrence,
Inventor
By his Attorneys
Kenyon & Kenyon

UNITED STATES PATENT OFFICE.

JAMES LAWRENCE, OF NEW YORK, N. Y., ASSIGNOR TO STANLEY G. RANGER, OF NEW YORK, N. Y.

WATER-HEATER.

1,177,255.   Specification of Letters Patent.   Patented Mar. 28, 1916.

Application filed December 17, 1915. Serial No. 67,326.

*To all whom it may concern:*

Be it known that I, JAMES LAWRENCE, a subject of the King of Great Britain, and a resident of New York city, county and State of New York, have invented certain new and useful Improvements in Water-Heaters, of which the following is a specification.

My invention relates to heaters, and particularly to that class of heaters adapted for heating water by electricity, the flow of electricity being controlled by the temperature of the water.

One object of my invention is to provide a water heater wherein the heat from a source is transferred to the water without loss and in quantities varying with the prevailing temperature of the water.

Another object is to provide a water heater wherein there is attained a continuous circulation of the water relatively to the portion of the heater to which heat is applied.

Another object is to provide, in a water heater wherein continuous circulation of the water is provided for, a heating device for rendering available a uniformly continuous quantity of heat and for intermittently supplying an auxiliary quantity of heat according to the temperature of the body of water to be heated.

Other and further objects and advantages will appear from the following description, taken in connection with the accompanying drawings forming part of this specification, and will be pointed out in the hereunto appended claims.

In the drawings, in which like reference characters indicate similar parts, Figure 1 is a front elevation of a water heater embodying my invention; Fig. 2 is a vertical section of the water heater shown in Fig. 1 on a plane vertical to the plane of Fig. 1; and Fig. 3 is a diagram of the electrical devices used in connection with the water heater.

It is desirable that a water heater in which electricity is used to supply the necessary heat shall be made as highly efficient as possible, and, to this end, the water heater herein described as one of the possible and preferred embodiments of my invention comprises a main water container 1, which is generally cylindrical in form, having a top 2 and a bottom 3. The bottom 3 has an opening 4 therein, and the heating chamber 5 is positioned in and closes this opening. The heating chamber 5 comprises a cylindrical portion 6, which fits within the hole 4, and a top member 7 which closes the top of the cylinder 6. Within the heating chamber 5 is a water heating unit 8, which may be of any form found to be efficient and practical, and which, in the embodiment illustrated by the drawings, comprises a helical coil of round pipe. The lower end of this unit is connected to the lower portion of the container by the pipe 9, which, in the embodiment herein disclosed, leads out through the bottom 3 and includes two T-couplings 10, which have plugs 11 in one branch, through which the pipe may be cleaned out. The top plate 2 of the container has an opening 12 in it, and the open tube 13 fits in and closes the opening and extends down to the top 7 of the heating chamber. The circulation pipe 14 extends from the upper end of the unit 8 up through the open tube 13 and extends above the top of the container 1, and communicates with the top portion of the container by means of the pipe sections 15 and 16. Connecting the pipe sections 14, 15 and 16, there are two T-couplings 17, in one of which is a closing plug 18, through which the pipe 14 may be cleaned, and to the other of which is connected the service pipe 19, which leads off to the point at which it is desired to use hot water. Cold water is led into the container through the pipe 20, which extends nearly to the bottom portion of the container 1, so that the cold water is supplied at the bottom of the container, and the pipe 20 discharges into the container on the opposite side of the container from the point at which the pipe 9 communicates with it. In the embodiment herein disclosed, it will be seen that the heating chamber 5 is between the points where the pipes 9 and 20 communicate with the container. The cylindrical walls of the container extend down below the bottom plate 3 thereof at 21, and the closure plate 22 has a flanged edge 23, which surrounds the extension 21. The heating chamber is thereby entirely inclosed and is positioned within the container.

The entire water heater is covered with a coating 24 of heat insulating material, such as magnesia or asbestos. This material extends down into the hollow tube 13 between its inner surface and the outer surface of the pipe 14.

It will be seen that in the water heater described, an internal circulation of the water is provided for. There are no pipes on the outside of the container and the heating chamber is entirely inclosed within the container, and whatever heat is not absorbed by the heating unit will, nevertheless, be absorbed by the water in the container through the walls 6 and 7 of the heating chamber. The top of the heating unit being connected to the top of the container and the bottom of the unit being connected to the bottom of the container, a continuous circulation of water can take place; and the service pipe, being connected to the pipe leading from the top of the heating unit to the top of the container at a point near the container, will draw hot water either from the circulating pipe or from the top portion of the container.

The electric heater used in connection with my water heater comprises two elements 25 and 26. The element 25 is constantly connected across the supply mains 27 so long as the service switches 28 are closed. The elements 25 and 26 are of any well-known design, for instance, they may be any type of resistance wire wound on refractory rods, but, as the type of heating element comprises no part of my invention, further details will not be referred to. The element 26 is similar in construction to the element 25, but it is intended that it shall only be connected to the mains 27 in parallel with the element 25 when the temperature of the water in the container falls to a certain degree, and it is intended that it shall be disconnected when the temperature reaches another degree. The element 26 is, therefore, connected across the mains 27 by means of a switch, which is thermostatically controlled. The wire 29 leads from one of the mains 27 to the movable contact member 30. The contact member 30 slides between blocks 31 and is held in its two possible positions by spring detents 32, which fit into depressions 33 in block 30. The wire 34 leads from contact 34', adapted to coöperate with the contact block 30, to the heating element 26, and this heating element is connected to the other main wire 27 by the wire 35. The contact block 30 is made of iron, and the magnets 36 and 37 are adapted to move it from one of its possible positions to the other.

The thermostat 50 comprises a needle 38, which is adapted to be moved around the dial 41 in accordance with the temperature of the water in any well-known manner, for instance, by a heat-sensitive device positioned within the container in the casing 51. The needle 38 is connected to one of the main wires 27. There are two contact members 39 and 40, which may be set at the limiting lower and upper temperature readings on the thermometer dial 41. The member 39 is connected to the magnets 36, and the member 40 is connected to the magnets 37, and the circuits from these magnets join and lead to the opposite main wire 27 from that which is connected to the needle 38. It will be seen that, when the temperature of the water in the container drops, so that the needle 38 swings around and comes in contact with the member 39, the magnets 36 will be energized and the contact block 30 will be moved into electrical connection with the wire 34, and the auxiliary heating coil 26 will be energized. When the temperature of the water has risen, so that the needle 38 comes in contact with the member 40, the magnets 37 will be energized, and, since the needle 38 is no longer in contact with the member 39, the magnets 36 will be deënergized and the block 30 will be pulled away from the contact 34' and the heating element 26 will be deënergized.

It will be seen from the above description that I have provided a water heater having a circulation pipe to provide continuous circulation from the bottom of said container to the top, in which pipe there is a heating unit to which a definite amount of heat is constantly supplied for the purpose of making good radiation and circulation losses, and that I provide an auxiliary heater for supplying an additional amount of heat to the heating chamber and the water-heating unit whenever the temperature of the water in the container falls to a low degree.

While I have described with great detail one embodiment of my invention, I do not intend that my invention shall be limited to the specific features herein described, but intend that all variations, adaptations and modifications which may occur to anyone skilled in the art may fall within the scope of my invention, and that it shall be defined only by the hereunto appended claims.

What I claim and desire to secure by Letters Patent of the United States is the following:—

1. In a device of the class described, a container, a heating chamber formed therein, a circulation pipe leading from the bottom of said container to the top thereof and including a portion positioned in said chamber, a source of heat in said chamber, and inlet and outlet pipes for said container.

2. In a device of the class described, a container, a heating chamber formed therein, a circulation pipe leading from the bottom of said container through said chamber and then upwardly through said container and being in communication with said container at its top, a source of heat in said chamber, and inlet and outlet pipes for said container.

3. In a device of the class described, a container, an inclosed heating chamber formed therein, a circulation pipe leading from the bottom of the container into, through and out of said chamber and through said container and communicating with the top portion thereof, a heater in said chamber comprising a continuously-energized element and an auxiliary element, the energization of which depends upon the temperature of the contents of the container, and inlet and outlet pipes for said container.

4. In a device of the class described, a container having a recess formed in the lower face thereof, a heating unit in said recess, a pipe leading to said unit from the bottom of said container, a pipe leading from said unit through the upper wall of said recess into and through said container and communicating with the upper part of said container, an outlet pipe communicating with the upper part of said container, and an inlet pipe communicating with the lower portion of said container.

5. In a device of the class described, a container, a heating chamber formed in the lower portion thereof, a heating unit in said chamber, said unit communicating with the upper portion of said container and with the lower portion of said container on one side of said chamber, an inlet pipe communicating with the lower portion of said container on the other side of said chamber, an outlet pipe for said container, and a heating device in said chamber.

6. In a device of the class described, a container, a heating chamber formed in the lower portion thereof, an open tube extending from the upper part of said chamber through said container, a circulation pipe extending from the lower portion of said container through said chamber and tube and communicating with the upper portion of said container, supply and outlet pipes for said container, and a heating device in said chamber.

7. In a device of the class described, a container, a heating chamber formed therein, an electric heater in said chamber, said heater comprising an element constantly connected to the source of electric supply, and an element adapted to be intermittently connected to the source of electric supply, and means controlled by the temperature of the contents of the container for producing said intermittent connection.

8. In a device of the class described, a container, a heating chamber formed therein, an electric heater in said chamber, said heater comprising an element constantly connected to a source of electric supply and an element adapted to be intermittently connected to said source, a switch for making such intermittent connection, means for operating said switch, and means dependent on the temperature of the contents of said container for controlling the operation of said last-named means.

9. In a device of the class described, a container, a source of heat associated therewith and comprising an element continuously generating a uniform quantity of heat, and an element generating heat according to the temperature of the contents of the container, and inlet and outlet pipes for said container.

10. In a device of the class described, a container, a circulation pipe including a heating unit leading from the bottom of said container to the top thereof to provide continuous circulation, a heater associated with said unit and comprising an element generating a uniform quantity of heat, and an element generating heat according to the temperature of the contents of the container, and inlet and outlet pipes for said container.

In testimony whereof, I have signed my name to this specification.

JAMES LAWRENCE.

Copies of this patent may be obtained for five cents each, by addressing the "Commissioner of Patents, Washington, D. C."